United States Patent [19]

Van Diemen et al.

[11] Patent Number: 4,992,225
[45] Date of Patent: Feb. 12, 1991

[54] WATER CORROSION-RESISTANT CERAMIC OXIDE BODY

[75] Inventors: Paul Van Diemen, San Jose, Calif.; Kenneth W. Lay, Schenectady, N.Y.

[73] Assignee: General Electric Company, San Jose, Calif.

[21] Appl. No.: 260,211

[22] Filed: Oct. 19, 1988

Related U.S. Application Data

[63] Continuation-in-part of Ser. No. 151,767, Feb. 3, 1988, abandoned.

[51] Int. Cl.⁵ .............................................. F27B 9/04
[52] U.S. Cl. .................................. 264/65; 376/339; 264/66; 252/478
[58] Field of Search ........................ 264/65, 125, 66; 376/339; 252/478

[56] References Cited

U.S. PATENT DOCUMENTS 3,898,309  8/1975  Pasto ................................. 264/0.5

Primary Examiner—Stephen J. Lechert, Jr.
Assistant Examiner—Nina Bhat
Attorney, Agent, or Firm—Robert R. Schroeder

[57] ABSTRACT

A lanthanide oxide selected from the group consisting of dysprosium oxide, erbium oxide, europium oxide, gadolium oxide and samarium oxide is formed into a compact and sintered to produce a body useful as a control rod material in a water cooled nuclear reactor. The lanthanide oxide is preferably combined with a corrosion stabilizing group 4A metal oxide such as hafnium oxide.

32 Claims, No Drawings

WATER CORROSION-RESISTANT CERAMIC OXIDE BODY

This application is a continuation in part of application Ser. No. 151,767, filed Feb. 3, 1988 of the same title now abandoned.

The present invention relates to the production of a sintered polycrystalline body comprising a lanthanide rare earth oxide. The sintered body is a neutron-absorbable material which can be made resistant to water corrosion and which is particularly useful as a control rod material for water-cooled nuclear reactors In a nuclear reactor, the fissionable material or nuclear fuel is enclosed in a container to form a fuel element. The fuel elements are assembled together in a lattice at fixed distances from each other in a coolant flow channel or region forming a fuel assembly, and sufficient fuel assemblies are combined to form the nuclear fissionable chain reacting assembly or reactor core capable of a self-sustained fission reactor. The core is enclosed within a reactor vessel through which a coolant is passed.

Control rods are used in nuclear fuel reactors to control power generation levels by being moved in and out of the coolant in the reactor core as needed. Generally, they are comprised of a control rod material contained within a protective metal cladding. To be effective, the control rod material must be neutron-absorbable. Under operating conditions, the metal cladding is a substantially stable material which functions to prevent contact between the control rod material and the coolant.

Boron carbide is presently used as a control rod material for nuclear reactors. It suffers from the disadvantage that helium is formed from the $\eta$ alpha reaction during neutron capture Boron-10 undergoes a single neutron interaction which then renders the isotope ineffective as an absorber. This limits the usefulness of boron carbide for use in long-life control rod assemblies.

Several lanthanide oxides (especially oxides of Eu, Er, Sm, Gd, and Dy) are of interest as replacements for boron carbide for long-life control elements. None of these high molecular weight elements form helium during neutron capture. All of these lanthanide oxides have multiple stable isotopes which transmute to another effective neutron absorber after an $\eta$ gamma capture reaction. This provides for longer service in long-life control rod assemblies. However, one possible disadvantage of these oxides is their potential for reactivity with water to form hydroxides. If the protective cladding on the control rod is rendered inactive, it is possible that the oxide will be leached from the control rod or that swelling from the formation of hydroxides will deform the control rod. It would be desirable to have lanthanide oxide composition which would be more resistant to water corrosion.

In the present invention, additions of a group 4A metal oxide comprising hafnium, zirconium and titanium to lanthanide oxide greatly improves their resistance to water corrosion. The new compositions are potential long-life replacements for the present boron carbide control rod materials.

Briefly stated, the present process includes forming a particulate mixture of a group 4A metal oxide such as hafnium oxide ($HfO_2$) and a lanthanide rare earth oxide selected from the group consisting of dysprosium oxide ($Dy_2O_3$), erbium oxide ($Er_2O_3$), europium oxide ($Eu_2O_3$), gadolinium oxide ($Gd_2O_3$), samarium oxide ($Sm_2O_3$) and a combination thereof said hafnium oxide ranging from about 10% by weight to about 25% by weight of said mixture, forming said mixture into a compact and sintering the compact at a temperature ranging from about 1500° C. to about 2000° C. to produce a sintered body wherein the outside surface of said body has no significant open porosity and wherein said body has a porosity of less than about 10% by volume of said body.

The present sintered body is a polycrystalline material comprised of grains having the cubic structure of the rare earth as ascertained by x-ray diffraction analysis.

In carrying out the preferred embodiment of the present process, a mixture of the group 4A metal oxide water corrosion stabilizer and the lanthanide oxide is formed. The corrosion stabilizing metal oxide can range from about 10% by weight to about 25% by weight, preferably from greater than about 10% by weight to less than about 20% by weight and most preferably it is about 12% by weight, of the mixture. Amounts of corrosion stabilizing metal oxides below about 10% by weight may not produce a ceramic sufficiently resistant to water corrosion to make it useful as a control rod material in a watercooled nuclear reactor. Amounts of the stabilizing metal oxide higher than about 25% by weight will not produce the present ceramic body comprised of grains having the cubic structure of the rare earth. Both hafnium oxide and the present lanthanide oxide are known in the art as neutron-absorbable materials. However, the neutron absorbency of the present lanthanide oxides is significantly or substantially greater than that of the preferred hafnium oxide corrosion stabilizer. The greater the neutron absorbency of a material, the more effective it is as a control rod material. As the amount of hafnium oxide is increased in the present sintered body, its neutron-absorbency is decreased. A sintered body containing significantly more than about 25% by weight hafnium oxide will have a significantly or substantially lower neutron absorbency.

One preferred embodiment of this invention comprises a mixture of the combination, in mole weight percent, of europium oxide in amount of about 15 to 20%, dysprosium oxide in amount of about 50 to 75% and hafnium oxide in amount of about 10 to 25%

The group 4A metal oxides and lanthanide oxides used in the present process are sinterable powders. Generally, they have a specific surface area ranging from about 2 to about 12 square meters per gram, preferably from about 4 to 8 square meters per gram. Such powders allow sintering to be carried out within a reasonable length of time at the present sintering temperature.

The corrosion stabilizing metal oxides comprising hafnium oxide and a lanthanide oxide can be admixed by a number of conventional techniques such as, for example, ball milling, to produce at least a significantly or substantially uniform mixture. The more uniform the mixture, the more uniform is the microstructure, and therefore, the properties of the resulting sintered body.

A number of conventional techniques can be used to shape or press the mixture into a compact. For example, it can be extruded, injection molded, die pressed or isostatically pressed to produce the compact of desired shape. Any lubricants, binders or similar materials used to aid shaping of the mixture should have no significant deleterious effect on the compact or the resulting sintered body. Such shaping-aid materials are preferably of the type which evaporate on heating at relatively low temperatures, preferably below 500° C., leaving no residue, or no significant residue. Preferably, the compact has a porosity of less than about 60% and more preferably less than about 50% to promote densification during sintering.

The compact can have any desired configuration such as, for example, a sphere, cylinder or plate. Preferably, it is in the shape desired of the sintered body.

The compact is sintered under conditions which will produce the present sintered body. The compact is stable in a variety of atmospheres and as a practical matter it is sintered in an atmosphere which depends largely on the particular furnace available. Representative of useful atmospheres are hydrogen, air, and a noble gas, for example, argon and helium. Preferably, the atmosphere. is at or about atmospheric pressure. Sintering also can be carried out in a vacuum. The atmosphere or vacuum should have no significant deleterious effect on the compact or sintered body.

The rate of heating to sintering temperature is limited largely by how fast any by-product gases are removed prior to sintering and generally this depends on the gas flow rate through the furnace and its uniformity therein as well as the amount of material in the furnace. Generally, a rate of heating of from about 50° C. per hour to about 300° C. per hour is used until by-product gases have been removed from the furnace, and this may be determined empirically by standard techniques. The rate of heating can then be increased, if desired, to a range of about 300° to 500° C. per hour and as high as 800° C. per hour but should not be so rapid as to crack the bodies.

The compact is sintered at a temperature at which the hafnium oxide or other group 4A oxides and the lanthanide oxide are solid. Generally sintering temperature ranges from about 1500° to about 2000° C. frequently from about 1700° to about 1900° C.

The compact is maintained at sintering temperature for a time required to produce the present sintered body. Time at sintering temperature is determinable empirically with lower temperatures generally requiring longer times.

Sintering is carried out at least until the sintered body has a porosity of less than about 10% and until substantially all of the pores in its outside surface are closed Specifically, the sintered body should have an outside surface free of significant open porosity. A number of conventional techniques can be used to determine such closed porosity at the surface. For example, it can be determined by mercury intrusion porosimetry. Generally, all or substantially all of the pores of the sintered body are closed, i.e. non-interconnecting, when it has a porosity ranging up to about 7%, or up to about 10% by volume.

Upon completion of sintering, the sintered product is cooled to produce the present sintered body, and usually it is cooled to ambient or to about room temperature, which generally ranges from about 20° to about 30° C. The rate of cooling of the sintered product or body is not critical, but it should not be so rapid as to crack the body. Specifically, the rate of cooling can be the same as the cooling rates normally used in commercial sintering furnaces. These cooling rates may range from about 100° to about 800° C. per hour. The sintered product or body can be cooled in the same atmosphere in which it was sintered or a different atmosphere which has no significant deleterious effect thereon Generally, in the present process, there is no loss, or no significant loss, of the group 4A metal oxide or lanthanide oxide.

The present sintered body is comprised of the preferred hafnium oxide and the present lanthanide oxide. The hafnium oxide ranges from about 10% by weight to about 25% by weight, preferably from greater than about 10% by weight to less than about 20% by weight, and more preferably from about 11% by weight to about 15% by weight, of the body. Most preferably, hafnium oxide comprises about 12% by weight of the body. In a preferred embodiment, the present sintered body is comprised of about 12% by weight hafnium oxide, about 18% by weight of europium oxide and about 70% by weight of dysprosium oxide.

The present sintered body is a single phase material. The phase can be represented by the formula $Ln_{2-y}Hf_yO_{3+y/2}$.

Generally, the present sintered body has an average grain size ranging from about 5 microns to about 250 microns, frequently from about 25 microns to about 250 microns, and more frequently from about 25 microns to about 50 microns.

The present sintered body has a porosity of less than about 10% by volume, preferably less than about 6% by volume, more preferably less than about 5% by volume, of the body. The less porosity the sintered body has, the better is its neutron absorbency. Preferably, pores in the sintered body are significantly or substantially uniformly distributed in the body.

Ordinarily, the dimensions of the present sintered body differ from those of the unsintered body by the extent of shrinkage, i.e. densification, which occurs during sintering.

The present sintered body containing the group 4A metal oxide corrosion stabilizer is resistant to water corrosion. After four hours in steam at 288° C., it shows no significant weight loss, that is any weight loss under such conditions would be less than about 0.01% by weight of the body.

It is, however, within the scope of this invention to dispense with the metal oxide water corrosion stabilize ingredient when the integrity of the housing container for the lanthanide oxide neutron absorbent can be assured against breaching through effective design, durable materials and flawless workmanship. For example, an embodiment can comprise about 25 mole weight percent of europium oxide combined with about 75 mole weight percent of dysprosium oxide, enclosed and sealed within a high strength, break resisting housing container.

Generally, to form a control rod, a plurality of the present sintered bodies are confined within a metal rod or cladding. Generally, the metal is stainless steel.

The invention is further illustrated by the following examples wherein the procedure was as follows, unless otherwise stated:

Sinterable powders of hafnium oxide and the lanthanide rare earth oxide were used.

The powders were admixed in a standard manner by stirring to produce a substantially uniform mixture.

The mixture was die pressed in a steel die to give a green body in the form of a disc with a porosity of about 50%.

The sintering atmosphere was hydrogen

The sintering atmosphere was at or about atmospheric pressure.

Sintering was carried out in a refractory metal furnace with tungsten heating elements and tungsten and molybdenum heat shields.

The sintered bodies were furnace cooled to about room temperature.

Density was determined in a standard manner by weighing the sintered body and measuring its dimensions.

Porosity of the sintered body was determined by knowing or estimating the theoretical density of the sintered body on the basis of its composition and comparing that to the density measured using the following equation:

$$\text{porosity} = \left(1 - \frac{\text{measured density}}{\text{theoretical density}}\right) 100\%$$

Average grain size of the sintered body was determined in a standard manner by the line intercept method. Specifically, a line was drawn on a photomicrograph of a polished and etched cross-section of the sintered body, and the grain boundaries intercepting along a specific length of line were counted and divided into that specific length of line to give an average grain intercept length in terms of microns. That value was then multiplied by 1.5 to determine the average grain size.

The sintered body was characterized by a number of standard techniques

EXAMPLE 1

Compacts comprised of 84% by weight $Dy_2O_3$ and 16% by weight of $HfO_2$ were sintered at 1900° C. for 4 hours. The porosity determined on one of the sintered samples was about 6% by volume. From other work it was known that the outside surface of the sintered bodies was essentially a closed pore surface, i.e. it had no significant open porosity Another sintered sample was determined to have an average grain size of 16 microns. X-ray diffraction analysis of another of the sintered samples showed that it was single phase and had a cubic rare earth structure.

Compacts comprised of 46% by weight $Dy_2O_3$ and 54% by weight $HfO_2$ were sintered at 1900° C. for 4 hours. The porosity determined on one of the sintered samples was about 7%. Another sintered sample was determined to have an average grain size of 19 microns. X-ray diffraction analysis of another of the sintered samples showed that it had a fluorite structure.

A compact comprised of 100% $Dy_2O_3$ was sintered at 1800° C. for 4 hours. The porosity determined on a piece of the sintered sample was about 9%. X-ray diffraction analysis of another piece of the sintered sample showed that it had a cubic rare earth structure. A piece of the sintered sample was tested.

The reactivity of the sintered samples with high-pressure, high-temperature water was determined in an autoclave. The autoclave was temperature controlled with the pressure determined by the boiling point pressure of water at the control temperature. About two hours were required to reach temperature at the start of a run. The samples were held in a Monel mesh holder located about one inch from the axis of a shaft which was rotated in the water at approximately 100 rpm.

The test conditions were 288° C. for one hour. The pure dysprosium oxide sample was gone from the same holder and presumably totally reacted with the water to form a hydroxide. The other two samples, i.e. one comprised of 84% by weight $Dy_2O_3$ and 54% by weight $HfO_2$, showed little evidence of reaction with the water.

EXAMPLE 2

A sintered body comprised of 84% by weight of dysprosium oxide and 16% by weight of hafnium oxide was produced in substantially the same manner set forth in Example 1.

The reactivity of the sintered sample was determined in an autoclave in substantially the same manner set forth in Example 1 except as noted herein. The sintered sample was polished to remove most of a surface coating of molybdenum and tungsten oxide contamination resulting from the sintering furnace. The sample was also measured and weighed before the autoclave test. There was no discernible change in the sample after four hours at 288° C. Specifically, the sample showed a negligible 0.00003 gram weight loss for 1.27375 gram sample.

EXAMPLE 3

The high corrosion rate of $Dy_2O_3$ was confirmed by a series of lower temperature tests. The tests were done using a piece of the $Dy_2O_3$ sintered disc produced in Example 1. Initially the sample was placed in boiling water at 100° C. for one hour. There was no measurable weight change and the sample appearance was unchanged when examined at 36x in a microscope. The same sample was then tested in the autoclave in substantially the same manner set forth in Example 1 except as noted herein. It was placed in the autoclave for one hour at 177° C. Again no weight change could be detected. The sample was then autoclaved for one hour at 225° C. The sample disintegrated completely.

Neutron absorbing materials and/or their mass can be selectively deployed in a control unit to provide a pattern of neutron absorption capacity which matches the uneven neutron flux density encountered by the control unit in the reactor fuel core environment. Typically in a boiling water reactor system, the neutron flux density is greater at the upper end of a control unit inserted from the bottom of the reactor, and also greater at the outer edge portion of a blade type control unit such as the common cruciform shaped devices. Thus the neutron absorbing body and material contained within the control unit can be varied and patterned in its mass and/or composition throughout the unit to provide increased neutron absorption capacity in areas thereof such as across the upper portion of the radially extending blades and/or also along the length of the outermost vertical edge of such blades. With such arrangements the increased mass or cost of higher absorptive capacity is not unnecessarily utilized and wasted in areas of minimum need due to customizing or matching capacity of the unit with the encountered flux pattern environment.

In a pressure water reactor system the neutron absorbing materials and/or their mass can likewise be selectively deployed within the control rods or other units to provide a pattern of neutron absorption capacity matching the uneven neutron flux density which is encountered within the reactor fuel body.

The lanthanide rare earth oxide neutron absorbents of this invention can be utilized with other neutron absorbents such as boron carbide, with each deployed in predetermined zones within a control unit as a means of customizing and matching the neutron absorbing capacity of the unit to that of the environment of its service within a reactor fuel core.

What is claimed is:

1. A process for producing a sintered body useful as a control rod material in a water cooled nuclear reactor which consists essentially of forming particles of a lanthanide rare earth oxide selected from the group consisting of dysprosium oxide, erbium oxide, europium oxide, gadolinium oxide, samarium oxide and a combination thereof, forming said particles into a compact and sintering the compact at a temperature ranging from about 1500° C. to about 2000° C. to produce a sintered polycrystalline body wherein the outside surface of said body has no significant open porosity and wherein said body has a porosity of less than about 10% by volume of said body.

2. A process for producing a sintered body useful as a control rod material in a water cooled nuclear reactor which comprises forming particles of a lanthanide rare earth oxide selected from the group consisting of dysprosium oxide, erbium oxide, europium oxide, gadolinium oxide, samarium oxide and a combination thereof, mixed with hafnium oxide in amounts of from about 10% by weight to about 25% by weight of said mixture forming said particles into a compact and sintering the compact at a temperature ranging from about 1500° C. to about 200° C. to produce a sintered body wherein the outside surface of said body has no significant open porosity and wherein said body has a porosity of less than about 10% by volume of said body.

3. The process according to claim 2 wherein said sintering is carried out in an atmosphere of hydrogen.

4. The process according to claim 2 wherein said sintering temperature ranged from about 1700° C. to about 1900° C.

5. A polycrystalline neutron-absorbable body consisting essentially of a single phase of a lanthanide rare earth oxide, said lanthanide rare earth oxide being selected from the group consisting of dysprosium oxide, erbium oxide, europium oxide, gadolinium oxide, samarium oxide and a combination thereof, said polycrystalline body being comprised of grains of the cubic structure of the rare earth oxides, said body having a porosity of less than about 10% by volume.

6. A polycrystalline neutron-absorbable body comprised of a single phase of a lanthanide rare earth oxide containing hafnium oxide in amounts of from about 10% by weight to less than about 25% by weight of said body, said lanthanide rare earth oxide being selected from the group consisting of dysprosium oxide, erbium oxide, europium oxide, gadolinium oxide, samarium oxide and a combination thereof, said body being comprised of grains of the cubic structure of the rare earth oxides, said body having a porosity of less than about 10% by volume.

7. A polycrystalline neutron-absorbent body comprised of about 15-35% by weight of europium oxide and about 65-85% by weight of dysprosium oxide, said body being comprised of grains of the cubic structure of the rare earth oxides.

8. A control rod for a water-cooled nuclear reactor consisting of control rod neutron absorbent material confined within a metal cladding, said control rod material being comprised of a plurality of sintered bodies, said sintered bodies consisting essentially of the sintered body of claim 6.

9. A process for producing a sintered body useful as a control rod material in a water cooled nuclear reactor which comprises forming a particulate mixture of a lanthanide rare earth oxide selected from dysprosium oxide and europium oxide, said dysprosium oxide ranging from about 65% by weight to about 85% by weight of said mixture and said europium oxide ranging from about 15% by weight to about 35% by weight, forming said mixture into a compact and sintering the compact at a temperature ranging from about 1500° C. to about 2000° C. to produce a sintered body wherein the outside surface of said body has no significant open porosity and wherein said body has a porosity of less than about 10% by volume of said body.

10. The process according to claim 9 wherein said mixture of dysprosium oxide and europium oxide mixture includes hafnium oxide in amounts of about 10% by weight to about 25% by weight of said mixture.

11. The process according to claim 9 wherein said sintering is carried out in an atmosphere of hydrogen.

12. The process according to claim 9 wherein said sintering temperature ranges from about 1700° C. to about 1900° C.

13. A polycrystalline neutron-absorbable body comprised of a mixture of lanthanide rare earth oxides selected from the group consisting of dysprosium oxide and europium oxide, said dysprosium oxide ranging from about 65% by weight to about 85% by weight of the mixture and said europium oxide ranging from about 15% by weight to about 35% by weight, said body being comprised of grains of the cubic structure of the rare earth oxides.

14. The polycrystalline body according to claim 13 wherein said mixture of dysprosium oxide and europium oxide mixture includes hafnium oxide in amounts of about 10% by weight to about 25% by weight of said body.

15. A polycrystalline neutron-absorbent body comprised of about 20% by weight of europium oxide and about 80% by weight of dysprosium oxide, said body being comprised of a single phase, said body being comprised of grains of the cubic structure of the rare earth oxides.

16. A control rod for a water-cooled nuclear reactor comprised of control rod neutron absorbent material confined within a metal cladding, said control rod material being comprised of a plurality of bodies, said bodies being comprised of the composition mixture of claim 13.

17. A process for producing a sintered body useful as a control rod material in a water cooled nuclear reactor which comprises forming a particulate mixture of at least one water stabilizing oxide selected from the group consisting of hafnium, zirconium and titanium and a lanthanide rare earth oxide selected from the group consisting of dysprosium oxide, erbium oxide, europium oxide, gadolinium oxide, samarium oxide and a combination thereof, said water stabilizing oxide ranging from about 10% by weight to about 25% by weight of said mixture, forming said mixture into a compact and sintering the compact at a temperature ranging from about 1500° C. to about 2000° C. to produce a sintered body wherein the outside surface of said body has no significant open porosity and wherein said body has a porosity of less than about 10% by volume of said body.

18. The process according to claim 17 wherein said water stabilizing oxide ranges from about 10% by weight to less than about 20% by weight of said mixture.

19. The process according to claim 17 wherein said sintering is carried out in an atmosphere of hydrogen.

20. The process according to claim 17 wherein said sintering temperature ranges from about 1700° C. to about 1900° C.

21. A polycrystalline neutron-absorbable body comprised of at least one water stabilizing oxide selected from the group consisting of hafnium, zirconium and titanium and a lanthanide rare earth oxide, said lanthanide rare earth oxide being selected from the group consisting of dysprosium oxide, erbium oxide, europium oxide, gadolinium oxide, samarium oxide and a combination thereof said water stabilizing oxide ranging from about 10% by weight to about 25% by weight of said body, said body being comprised of grains of the cubic structure of the rare earth oxides.

22. The polycrystalline body according to claim 21 wherein said water stabilizing oxide ranges from about 10% by weight to less than about 20% by weight of said body.

23. A polycrystalline neutron-absorbent body comprised of about 12% by weight water stabilizing oxide, about 18% by weight of europium oxide and about 70% by weight of dysprosium oxide, said body being comprised of a single phase, said body being comprised of grains of the cubic structure of the rare earth oxides.

24. A control rod for a water-cooled nuclear reactor comprised of control rod neutron absorbent material confined within a metal cladding, said control rod material being comprised of a plurality of bodies, said bodies being comprised of the composition mixture of claim 21.

25. A process for producing a sintered body useful as a control rod material in a water cooled nuclear reactor which comprises forming a particulate mixture of hafnium oxide and a lanthanide rare earth oxide selected from the group consisting of dysprosium oxide, erbium oxide, europium oxide, gadolinium oxide, samarium oxide and a combination thereof, said hafnium oxide ranging from about 10% by weight to about 25% by weight of said mixture, forming said particles into a compact and sintering the compact at a temperature ranging from about 1500° C. to about 2000° C. to produce a sintered body wherein the outside surface of said body has no significant open porosity and wherein said body has a porosity of less than about 10% by volume of said body.

26. The process according to claim 25 wherein said hafnium oxide ranges from about 10% by weight to less than about 20% by weight of said mixture.

27. The process according to claim 25 wherein said sintering is carried out in an atmosphere of hydrogen.

28. The process according to claim 25 wherein said sintering temperature ranges from about 1700° C. to about 1900° C.

29. A polycrystalline neutron-absorbable body comprised of a single phase of hafnium oxide and a lanthanide rare earth oxide, said lanthanide rare earth oxide being selected from the group consisting of dysprosium oxide, erbium oxide, europium oxide, gadolinium oxide, samarium oxide and a combination thereof, said hafnium oxide ranging from about 10% by weight to about 25% by weight of said body, said body being comprised of grains of the cubic structure of the rare earth oxides.

30. The polycrystalline body according to claim 29 wherein said hafnium oxide ranges from about 10% by weight to less than about 20% by weight of said body.

31. A polycrystalline neutron-absorbent body comprised of about 12% by weight hafnium oxide about 18% by weight of europium oxide and about 70% by weight of dysprosium oxide, said body being comprised of grains of the cubic structure of the rare earth, said body having a porosity of less than about 10% by volume.

32. A control rod for a water-cooled nuclear reactor comprised of control rod neutron absorbent material confined within a metal cladding, said control rod material being comprised of a plurality of bodies, said bodies being comprised of the composition mixture of claim 29.

* * * * *

UNITED STATES PATENT AND TRADEMARK OFFICE
CERTIFICATE OF CORRECTION

PATENT NO. : 4,992,225

DATED : February 12, 1991

INVENTOR(S) : Van Diemen, et al

It is certified that error appears in the above-identified patent and that said Letters Patent is hereby corrected as shown below:

On the title page, item [75] Inventors: should read
-- Paul van Diemen, Kenneth W. Lay, Richard A. Proebstle--
Column 7, line 28, "200°C." should read --2000°C.--

Signed and Sealed this

Seventeenth Day of November, 1992

*Attest:*

DOUGLAS B. COMER

*Attesting Officer*     *Acting Commissioner of Patents and Trademarks*